United States Patent
Bala et al.

(10) Patent No.: US 12,476,626 B1
(45) Date of Patent: Nov. 18, 2025

(54) SYSTEM AND METHOD FOR SKEW-TOLERANT, GLITCH-FREE MULTIPLEXING WITH AUTO-STROBE BURST DETECTION

(71) Applicant: Cadence Design Systems, Inc., San Jose, CA (US)

(72) Inventors: Phalguni Bala, Karnataka (IN); Gaurav Pradeep Bhojane, Pune (IN)

(73) Assignee: Cadence Design Systems, Inc., San Jose, CA (US)

( * ) Notice: Subject to any disclaimer, the term of this patent is extended or adjusted under 35 U.S.C. 154(b) by 105 days.

(21) Appl. No.: 18/501,075

(22) Filed: Nov. 3, 2023

(51) Int. Cl.
*H03K 5/1252* (2006.01)
*G06F 1/08* (2006.01)

(52) U.S. Cl.
CPC .............. *H03K 5/1252* (2013.01); *G06F 1/08* (2013.01)

(58) Field of Classification Search
None
See application file for complete search history.

(56) References Cited

U.S. PATENT DOCUMENTS

| | | | | |
|---|---|---|---|---|
| 4,970,405 A | * | 11/1990 | Hagiwara | G06F 1/08 327/295 |
| 6,982,573 B2 | * | 1/2006 | Hutson | G06F 1/08 327/99 |
| 7,401,243 B2 | * | 7/2008 | Knepper | G06F 1/3203 713/340 |
| 7,446,588 B2 | * | 11/2008 | Boerstler | H04L 7/0083 327/99 |
| 7,471,120 B2 | * | 12/2008 | Lou | G06F 1/04 327/407 |
| 2010/0318830 A1 | * | 12/2010 | Tsuchizawa | G01R 31/31709 713/400 |
| 2024/0201848 A1 | * | 6/2024 | Gupta | G11C 16/32 |

* cited by examiner

*Primary Examiner* — Thomas J. Hiltunen
(74) *Attorney, Agent, or Firm* — Mark H. Whittenberger; Holland & Knight LLP

(57) ABSTRACT

Embodiments included herein are directed towards a skew-tolerant, glitch-free multiplexer circuit. The circuit may include a first flip-flop configured to receive a gate signal and to generate an output. The circuit may further include auto-burst detection circuitry having second and third flip-flops. The auto-burst detection circuitry may be configured to receive the output at the second flip-flop and to generate an auto-burst detection circuitry output from the third flip-flop. The circuit may also include a plurality of flip-flops configured to receive the auto-burst detection circuitry output, wherein each of the plurality of flip-flops is configured to provide an input to a multiplexer.

16 Claims, 13 Drawing Sheets

SYSTEM AND METHOD FOR SKEW-TOLERANT, GLITCH-FREE MULTIPLEXING WITH AUTO-STROBE BURST DETECTION

BACKGROUND

Synchronous dynamic random-access memory (synchronous dynamic RAM or SDRAM) is any DRAM where the operation of its external pin interface is coordinated by an externally supplied clock signal. Graphics double data rate 7 synchronous dynamic random-access memory (GDDR7 SDRAM) is a type of synchronous graphics random-access memory (SGRAM) specified by the Joint Electron Device Engineering Council (JEDEC) Semiconductor Memory Standard, with a high bandwidth, double data rate interface. It is designed for use in graphics cards, game consoles, and high-performance computing. It is a type of GDDR SDRAM and is the successor to GDDR6.

SUMMARY

In one or more embodiments of the present disclosure, a skew-tolerant, glitch-free multiplexer circuit is provided. The circuit may include a first flip-flop configured to receive a gate signal and to generate an output. The circuit may further include auto-burst detection circuitry having second and third flip-flops. The auto-burst detection circuitry may be configured to receive the output at the second flip-flop and to generate an auto-burst detection circuitry output from the third flip-flop. The circuit may also include a plurality of flip-flops configured to receive the auto-burst detection circuitry output, wherein each of the plurality of flip-flops is configured to provide an input to a multiplexer.

One or more of the following features may be included. In some embodiments, the plurality of flip-flops may include two flip-flops. The plurality of flip-flops may receive a synchronous local clock and an RCK clock respectively. The auto-burst detection circuitry may perform half-rate RCK edge filtering. The circuit may include reset envelope generation circuitry configured to receive the output from the first flip-flop. The circuit may further include half-rate RCK edge filtering circuitry configured to receive the auto-burst detection circuitry output. The reset envelope generation circuitry may include two flip-flops. The half-rate RCK edge filtering circuitry may include two flip-flops. The multiplexer may include a two-phase clock multiplexer. The multiplexer may include a four-phase clock multiplexer.

In another embodiment of the present disclosure a method for use with a skew-tolerant, glitch-free multiplexer circuit is provided. The method may include providing a first flip-flop configured to receive a gate signal and to generate an output. The method may further include providing auto-burst detection circuitry having second and third flip-flops, the auto-burst detection circuitry configured to receive the output at the second flip-flop and to generate an auto-burst detection circuitry output from the third flip-flop. The method may also include receiving the auto-burst detection circuitry output at a plurality of flip-flops, wherein each of the plurality of flip-flops is configured to provide an input to a multiplexer.

One or more of the following features may be included. In some embodiments, the plurality of flip-flops may include two flip-flops. The plurality of flip-flops may receive a synchronous local clock and an RCK clock respectively. The auto-burst detection circuitry may perform half-rate RCK edge filtering. The circuit may include reset envelope generation circuitry configured to receive the output from the first flip-flop. The circuit may further include half-rate RCK edge filtering circuitry configured to receive the auto-burst detection circuitry output. The reset envelope generation circuitry may include two flip-flops. The half-rate RCK edge filtering circuitry may include two flip-flops. The multiplexer may include a two-phase clock multiplexer. The multiplexer may include a four-phase clock multiplexer.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
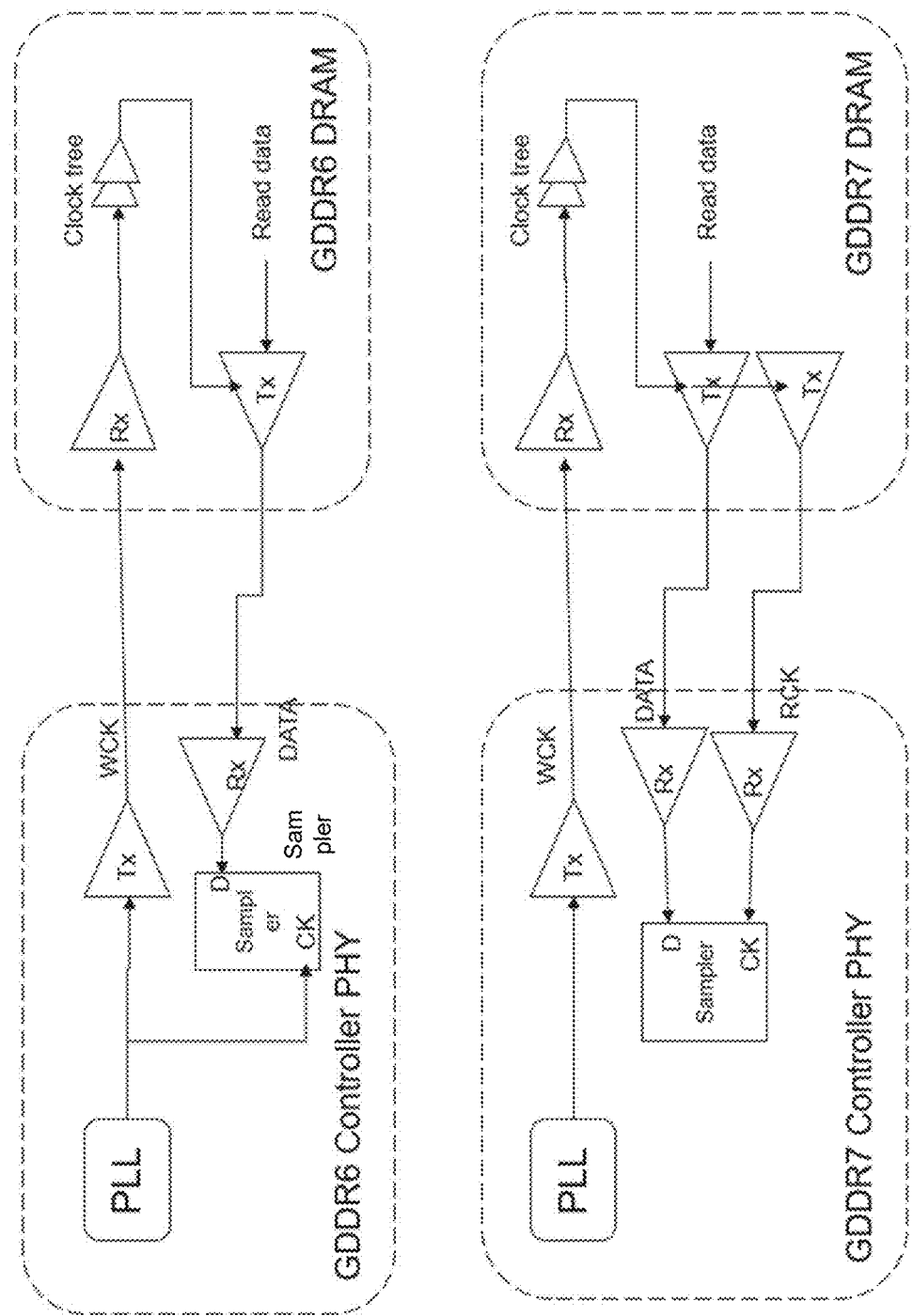
FIG. 1 is an example block diagram showing read path clocking examples of GDDR6 vs GDDR7.

Referring now to FIG. 1, an example block diagram 100 showing read path clocking examples of GDDR6 vs GDDR7. More specifically, FIG. 1 shows data transmission between a GDDR6 controller PHY and a GDDR6 DRAM and a GDDR7 controller PHY and a GDDR7 DRAM. WCK is the clock output from GDDR6/GDDR7 controller PHY to GDDR6/GDDR7 DRAM. The DRAM uses this WCK clock and generates the clock to sample incoming data from the controller and also output data from DRAM to controller. RCK is the strobe clock output from GDDR7 DRAM and may be generated from WCK clock input to the DRAM. The read data transmitted from GDDR7 DRAM to the GDDR7 controller PHY is synchronous with this RCK clock output. RCK can be continuous or burst in nature.

In GDDR6, the read path sampler may obtain a clock from the PLL and read data may be launched by the WCK after the clock tree in DRAM. These two paths may be unmatched by a time period. Read data will accumulate power supply induced jitter and random jitter in the controller PHY and DRAM with respect to the sampling clock. In GDDR7, the read data and the RCK are synchronous as they are launched from same WCK edge. In some cases, there may be no relative jitter accumulation between RCK and read data at the data samplers. For example, this may be true at the input of the controller PHY. However, the RCK distribution tree may cause a mismatch between the data and clock inputs of the sampler. This delay mismatch may be far less than when the PLL clock is used to sample the data.

In GDDR7, a separate differential RCK strobe is introduced to mitigate the longer jitter accumulation time issue present in the GDDR6 protocol. In GDDR6, during a read operation a local PLL clock is used to sample the read data coming from DRAM. The read data is launched from DRAM using a WCK clock sent from the controller PHY itself using same PLL clock. Though the read sampling clock and WCK/data are effectively driven by the same PLL but WCK and hence the read data suffers longer latency as the WCK clock tree in DRAM has a maximum latency. This may cause the read data to accumulate jitter with respect to the local clock. This longer jitter accumulation time has an adverse effect on the maximum read data transfer that can be achieved for a given bit error rate (BER).

Accordingly, embodiments of the present disclosure may mitigate this issue by introducing a differential strobe RCK for the read path. As such, both the data and RCK may be launched using the same WCK synchronously. The relative jitter between the data and RCK gets cancelled. Therefore, RCK strobe-based read path clocking may help to achieve a higher data rate for a given BER than a local PLL clock-based clocking scheme. The RCK may have burst mode, always on mode, and disable mode.

Figure 2:
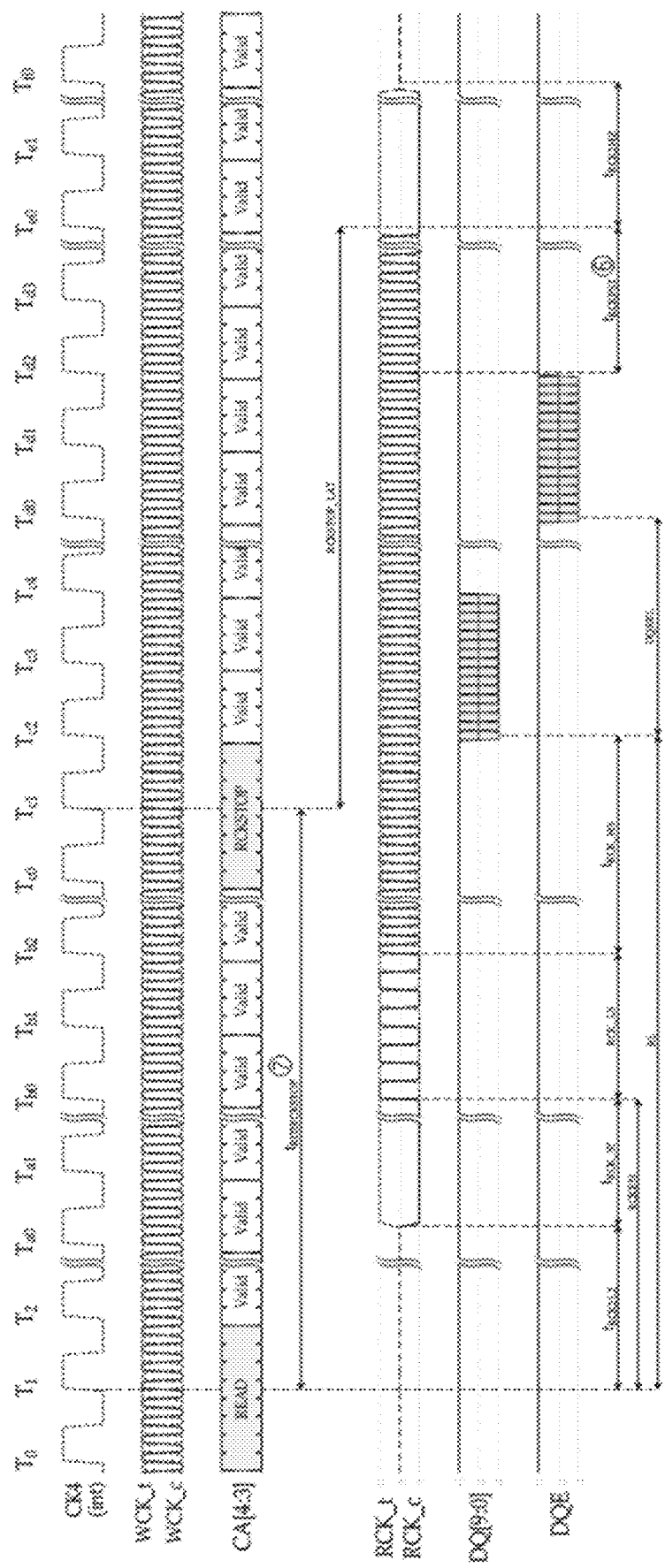
FIG. 2 is a timing diagram of a read operation with burst RCK in GDDR7.

As discussed above, in GDDR7, RCK may have burst, always on or disable mode. Referring now to FIG. 2, a timing diagram 200 of a read operation with burst RCK in GDDR7 is provided. During high-speed operation of GDDR7, typically a current mode logic (CML) clock tree may be used to take advantage of its lower power noise sensitivity. If the CML clock tree is parked in one logic state, ageing of the input stages of the CML tree may be uneven leading to offset accumulation in the tree which may cause duty cycle distortion at the clock output. There are solutions to prevent offset to accumulate by putting AC coupling in the clock tree, which requires a significant settling time to produce a stable clock. At samplers and subsequent stages, a CMOS clock may be used. An AC coupled CML2CMOS level shifter may be used for its superior performance at higher frequency. It may require some settling time before it produces a stable clock. In very high-speed applications like GDDR6/7 a phase interpolator (PI) is the main delay adjustor in the DQ read clock path for its superior performance. Again, the phase interpolator may also need a stable frequency input clock to produce correct clock phases at the output.

Therefore, for the entire clock path to maintain its operating state a stable clock is always needed. If the clock is stopped at any time, the clock path may need some settling time to produce a stable clock. During this settling time some of the clock cycle may be missed. Again, the read data path may be trained in the initialization phase using the memory controller. Synchronicity of the read path should be maintained. The synchronicity depends on read latency, FIFO read/write pointer relations, etc. The timing diagram of the RCK burst mode (FIG. 2) illustrates different RCK states to reach a full rate read strobe clock before actual read data arrives at the pad. If any of the RCK edges are missed while achieving a full rate, timing may be affected. Retraining of the read path may require a long iterative process.

In some embodiments, for quick RCK burst-to-burst turnaround time it is important that none of the RCK edges are missed and that the DRAM read path is always synchronized with the memory controller after initialization. If there is a long gap between two bursts, any VT drift of the clock tree may be unknown. It is important that during no RCK period, there should be a scheme to keep track of VT drift of this clock tree. Embodiments included herein may use an RCK strobe as a sampling clock to take advantage of lesser jitter accumulation. The CML clock tree and phase interpolator should always toggle at the full rate clock to ensure a quick burst-to-burst turnaround and to maintain synchronicity of the read path after initialization. Again, a scheme of continuous VT tracking of the clock tree even in non RCK period will improve the BER further.

Figure 3:
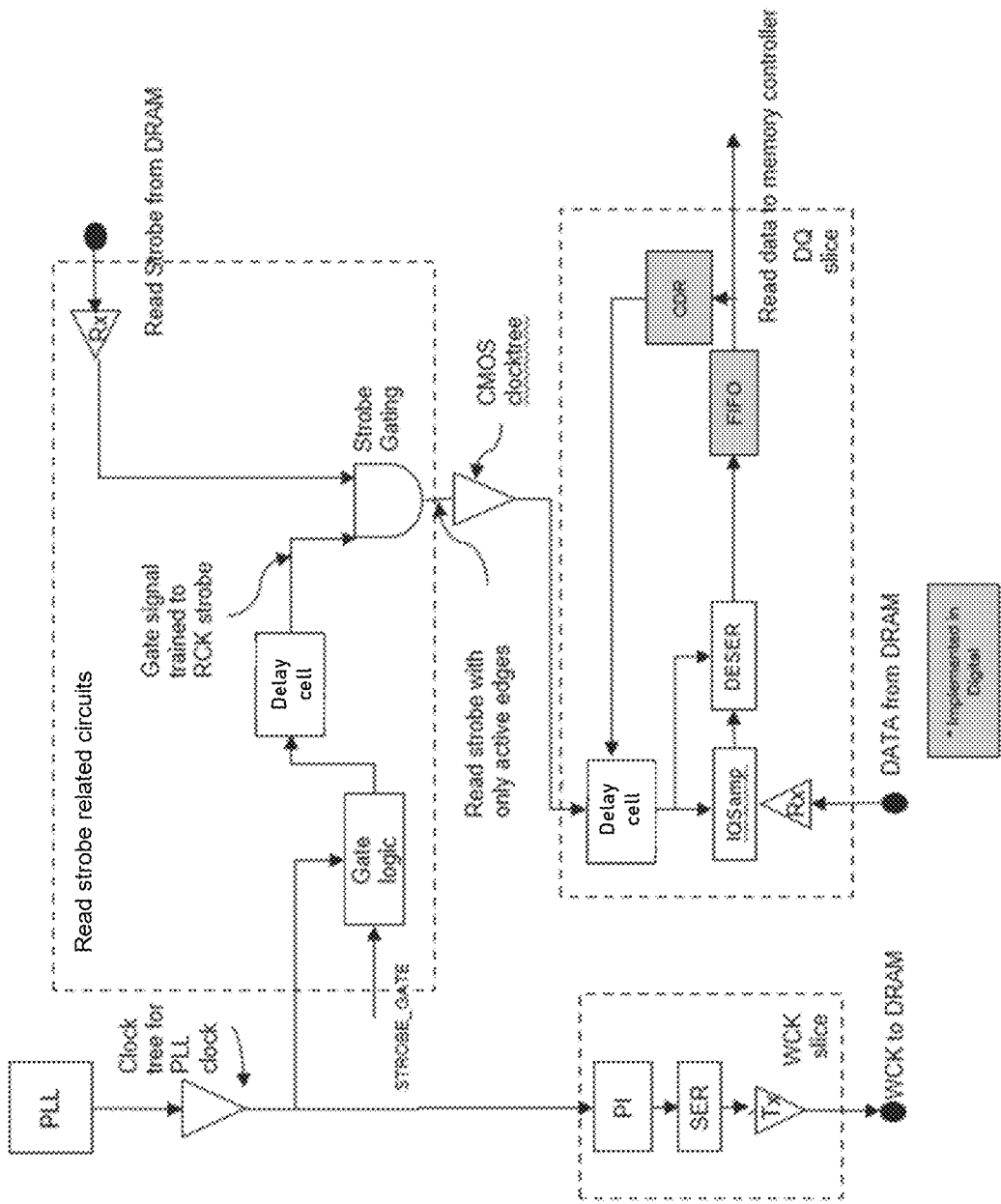
FIG. 3 is an existing approach for burst strobe based read path clocking.

Referring now to FIG. 3, a diagram 300 showing an existing approach for burst strobe based read path clocking is provided. Some burst strobe-based read path clocking solutions may include, for example, DDR4/5 HBM2/3, where a separate gate training is performed in the beginning so that only required strobe edges are passed. These solutions may work for lower data rates, where a CMOS clock tree is used along with delay cell-based phase adjustment as the CMOS clock tree and delay cells works with burst read strobe. For GDDR6/7 like applications where the CML clock tree, phase interpolators and AC coupled stages are used, the correct clock cannot be produced with only filtered active edges.

Figure 4:
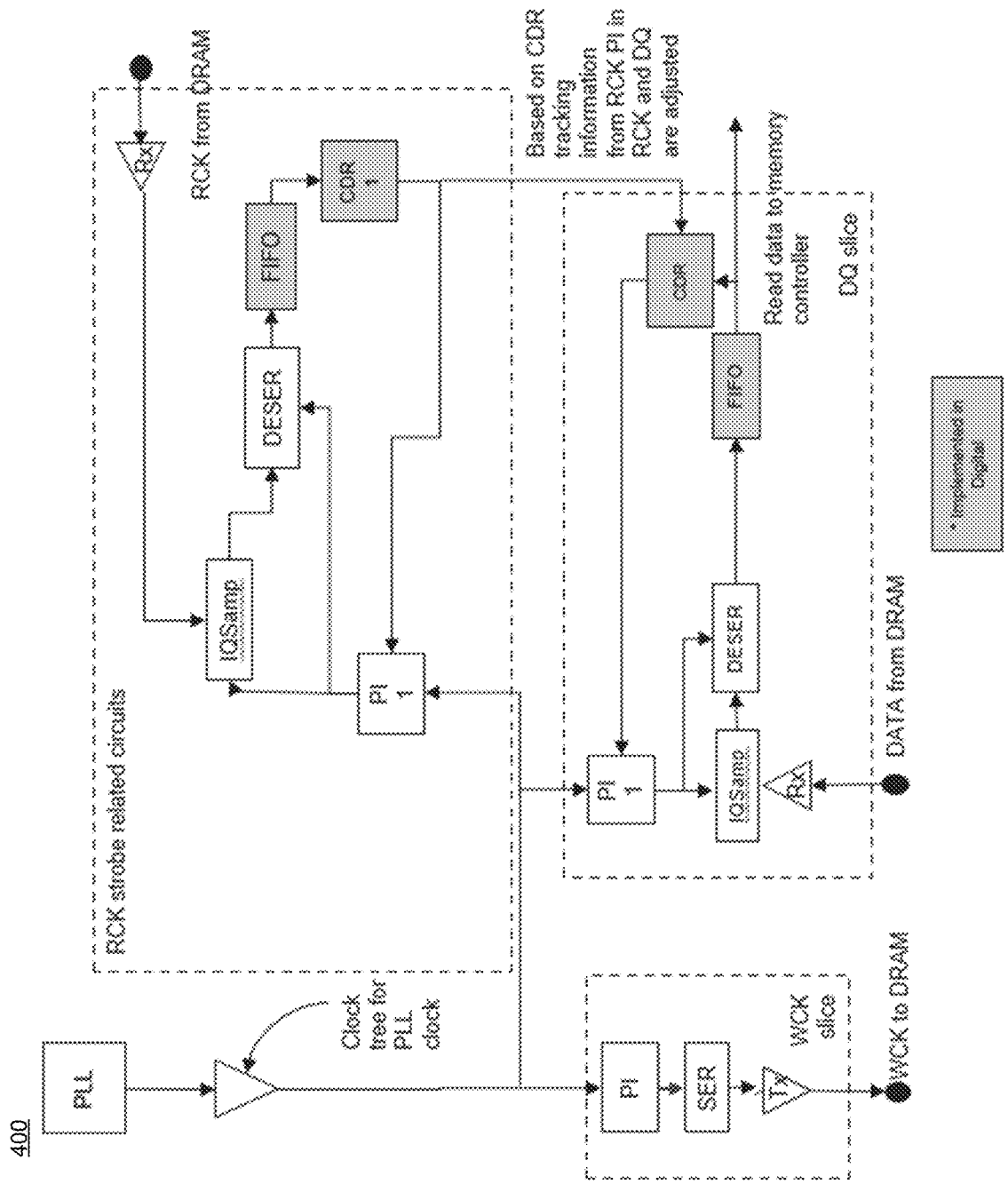
FIG. 4 is an existing approach for phase locked loop clock based read path clocking.

Referring now to FIG. 4, a diagram 400 showing an existing approach for phase locked loop clock based read path clocking is provided. This example shows a PLL clock based read path clocking, where received DQ and RCK are launched from DRAM using a delayed WCK sent from the same PLL clock. In this example, read data and RCK may accumulate jitter, greatly reducing the timing margin at the DRAM-PHY interface. RCK is used only for VT drift tracking and information is passed to the clock and data recovery in the data (DQ) slice. The phase interpolators (PI1) in the receive path of RCK and DQ slices may be adjusted to track the drift. If RCK is stopped for a long period of time, there is no tracking information. The read strobe position may drift from an optimal position thereby reducing the timing margin.

Referring now to FIGS. 5-8, embodiments depicting an RCK strobe-based read path clocking approach are provided. As discussed below, embodiments may include a full rate clock to CML tree and a phase interpolator to maintain synchronicity. Embodiments may include fast burst-to-burst turnaround and continuous VT tracking.

Figure 5:
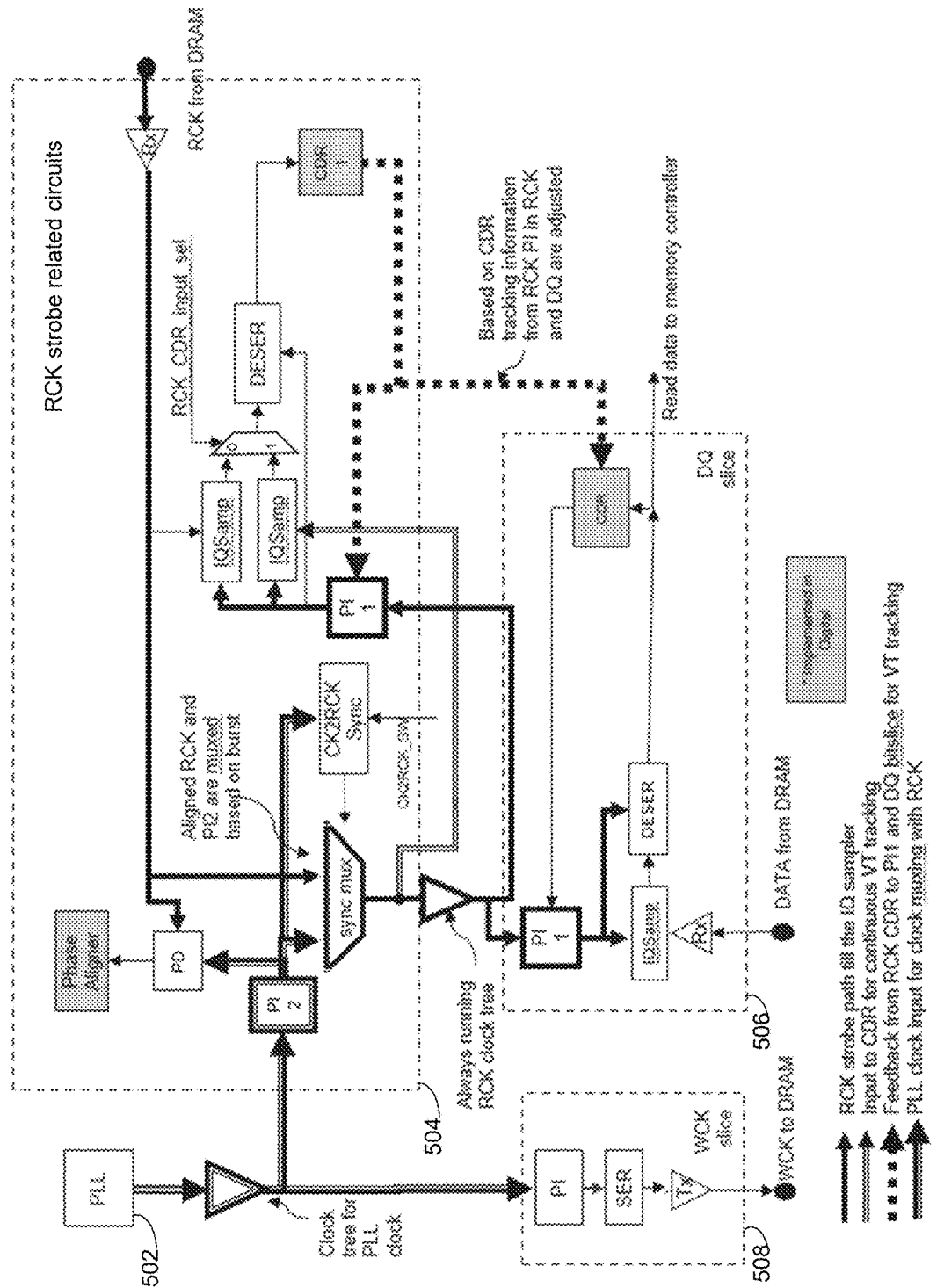
FIG. 5 is a block diagram of RCK strobe-based read path clocking consistent with embodiments of the present disclosure.
Figure 6:
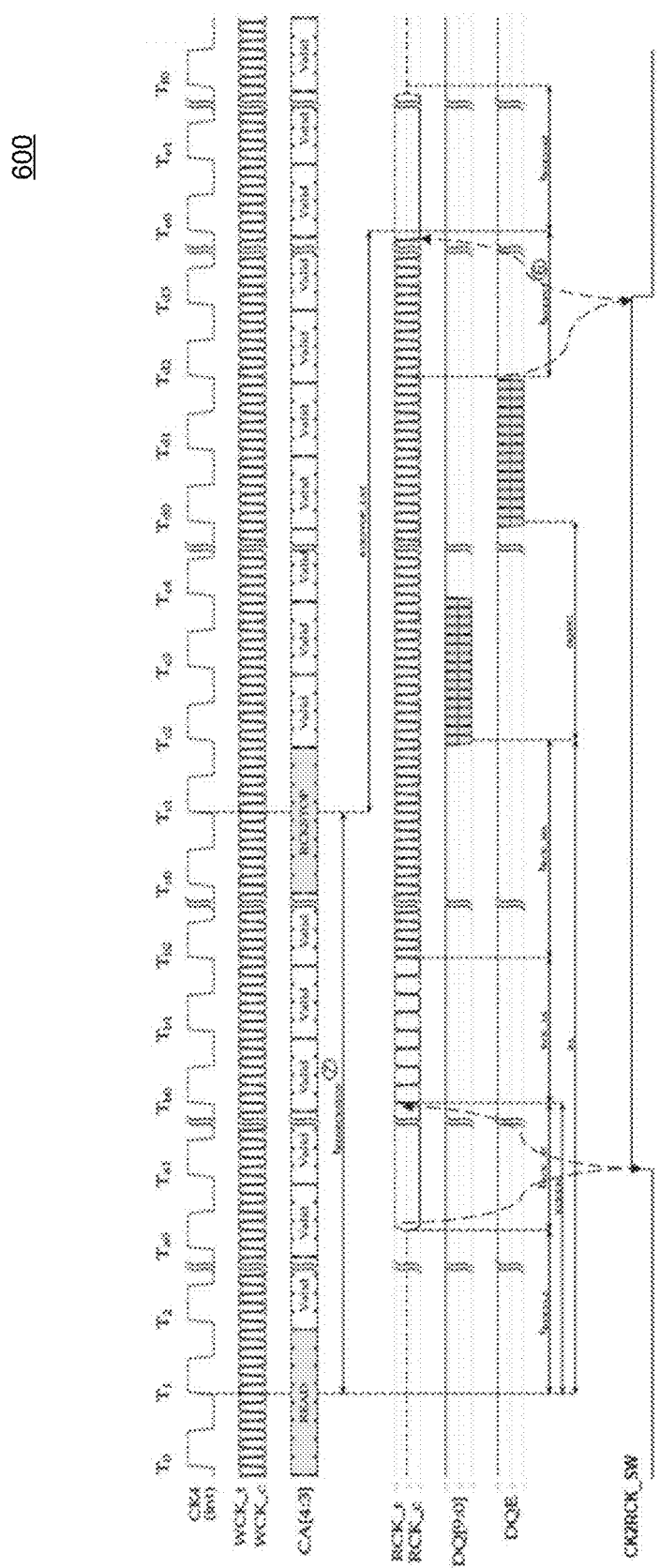
FIG. 6 is a timing diagram of a read operation with burst RCK in GDDR7 consistent with embodiments of the present disclosure.

Referring again to FIG. 5, a block diagram 500 of RCK strobe-based read path clocking consistent with embodiments of the present disclosure is provided. Diagram 500 includes PLL circuitry 502, RCK strobe related circuitry 504, DQ slice circuitry 506, and WCK slice circuitry 508. In this particular example, Rx to IQ samplers and clock path to IQ samplers in DQ slice circuitry 506 and RCK strobe related circuitry 504 are matched. Phase interpolator (PI2) located within RCK strobe related circuitry 504 may be used to align the clock with the incoming RCK with the help of the phase detector and phase aligner. A glitch free clock multiplexer located within RCK strobe related circuitry 504 may dynamically switch the clock between RCK and PI2 output based on RCK burst. A CK2RCK_SW signal may be generated by digital logic based on the RCK burst. It should be noted that no training is needed for the CK2RCK_SW signal. The RCK clock tree may always continue running at a full rate even though there is no RCK burst. RCK_CDR_input_sel is a programmable option to change an input to the clock and data recovery (CDR) so that any VT drift of the RCK tree is always tracked in burst or RCK disable modes. When there is no active RCK burst this approach ensures the system always runs at the full rate. Referring now to FIG. 6, a timing diagram 600 of a read operation with burst RCK in GDDR7 consistent with embodiments of the present disclosure is provided. In this example, CK2RCK_SW may be generated as per the RCK burst shown. The assertion is done when RCK is at static low and de-assertion is done before the RCK is stopped but after the last read data including DQE is received. As tRCKEN and RCKSTOP LAT are set by the controller PHY logic, the assertion and desertion may be timed without doing any separate trainings.

In some embodiments, the phase interpolator (PI2) may be configured to align its output clock of same frequency as RCK with incoming RCK with the help of the phase detector and phase aligner. Phase aligner may run in the background when the RCK burst is available so that RCK to phase interpolator (PI2) output offset does not build up high values. A CK2RCK_SW signal may be generated by digital logic based on RCK burst as shown in the timing diagram as shown in FIG. 6. A glitch free clock multiplexer may dynamically switch its output between RCK and the phase interpolator (PI2) output based on this CK2RCK_SW signal. No separate training is needed for CK2RCK_SW signal with respect to the incoming data. Since the phase interpolator (PI2) output is synchronous to RCK, switching back and forth may not have any effect on the FIFO pointers and all the clock dividers in the read datapath, maintaining synchronicity with the memory controller clock. Accordingly, no re-training of the read path is needed in the RCK burst mode. Since all the phase interpolators and the CML clock tree are always at a stable state the burst-to-burst turnaround time is not limited by their settling times. In other RCK modes CK2RCK_SW may be set to one level depending on the mode. In an "RCK disable mode" CK2RCK_SW=0 may send the phase interpolator (PI2) output as a read clock to the samplers. In an "RCK always on" mode CK2RCK_SW=1 may send the RCK as a read clock to the samplers. RCK_CDR_input sel is a programmable option to change the input to the clock and data recovery (CDR) so that the RCK tree VT drift is always tracked in burst and disable RCK modes. In an "always on RCK mode" selecting the RCK receiver output as the CDR input will track the VT drift of the whole clock path including clock multiplexer.

In some embodiments, during initialization RCK is started. The CK2RCK_SW signal may be asserted. It may propagate from the phase interpolator (PI2) domain to the RCK domain asynchronously for clock muxing. The RCK strobe may then be sent through the RCK clocktree to all of the Rx phase interpolators. It may then be allowed to settle. It should be noted that any glitch due to asynchronous muxing of the clock may not create any problem as all of the timing relations may be established after this step. Once the stable RCK passes through the read clock path, the read/write pointers of the FIFO between the RCK clock and digital domain may be synchronized. The next step is to enable the clock and data recovery in the RCK and dataslices and the phase interpolator (PI2) phase aligner in the RCK slice. They may run in parallel for faster locking. Until the CDRs and the phase aligner lock the RCK may be allowed to run continuously. After the CDR and the phase aligner in the RCK are locked, the clock multiplexer is ready for synchronously switching back and forth based on RCK burst controlled by CK2RCK_SW signal. And the clock multiplexer may produce a continuous clock even if the RCK is a burst by selecting the synchronous PI2 output. The CML clock tree, phase interpolator (PI1) and the downstream circuits shown in FIG. 5 may always toggle at the full rate clock only.

In some embodiments, in burst RCK mode, the CK2RCK_SW signal may be asserted in the phase where RCK_t/c pad is at stable '0' (as shown in FIG. 6). Internally, the signal may be delayed such that, when the full rate RCK arrives, the clock may be switched from the phase interpolator (PI2) output to RCK. During the preamble edges, settling to incoming RCK strobe may occur. The read data may then be received using the RCK strobe. The RCK may be stopped using the RCKSTOP command. The de-assertion of the CK2RCK_SW signal may be timed based on the RCKSTOP latency such that, last read data in all data lines are received with RCK edges and it is to be ensured that clock multiplexer is switched to the phase interpolator (PI2) output before the last edge of RCK reaches the multiplexer. When in the "always on RCK" mode the CK2RCK_SW signal may be asserted in the beginning, and it may remain high throughout. Since RCK is continuously running the timing relation is always maintained. In contrast, in RCK disable mode the CK2RCK_SW signal may remain logic '0' and the phase interpolator (PI2) output may always be driving the read clock path maintaining the timing relations of the read path. Since the RCK and data may be launched from the DRAM with the same WCK edges, they may be matched with the input of the receivers in the PHY. The RCK strobe may then be distributed through a CML clock tree, and phase interpolator to the samplers. This additional path delay of the sampling clock may cause some jitter accumulations with respect to the read data at the sampler inputs. The read clock path to data samplers may be replicated in RCK to its samplers so that any drift in the clock path may be sensed by the RCK clock and data recovery and all clock and data recovery in the dataslices and RCK slice may be adjusted to track VT drift in the clock path. For continuous VT drift of the clock tree in all modes, a programmable option "RCK_CDR_input_sel" may be used. In such a continuous mode it may be set to 0 to select IQ samplers with an Rx output as the data input and a phase interpolator (PI1) as the clock. Since RCK is always there continuous VT drift tracking will also be there. For the burst RCK mode, "RCK_CDR_input_sel" may be set to 1 so that IQ samplers select the clock multiplexer output as the data input. Since the clock multiplexer output always toggles at a full rate, a continuous VT drift tracking of the clock tree is possible even though RCK is absent. This is also true for the RCK disable mode.

Figure 7:
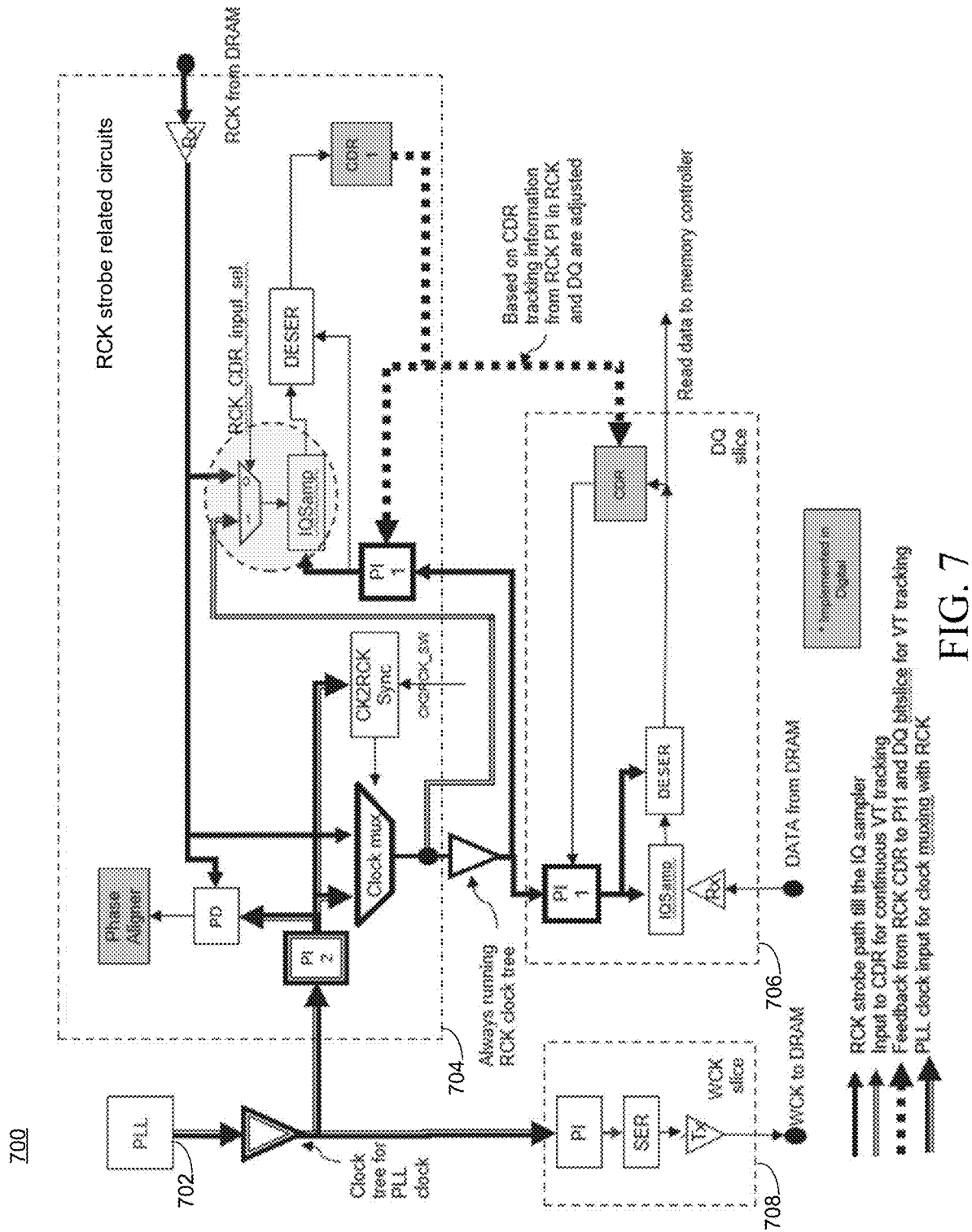
FIG. 7 is a block diagram of an alternative configuration consistent with embodiments of the present disclosure.

Referring now to FIG. 7, a block diagram 700 of an alternative configuration consistent with embodiments of the present disclosure is provided. Diagram 700 includes PLL circuitry 702, RCK strobe related circuitry 704, DQ slice circuitry 706, and WCK slice circuitry 708. In the embodiment of FIG. 5, there are two sets of IQ samplers used in the RCK block. The output of one set of the IQ samplers may be taken to the CDR circuitry for tracking based on the RCK_CDR_input_sel mode selected. In this alternate implementation the selection multiplexer may be moved to the input of the IQ sampler so that with one set of IQ samplers the same functionality may be achieved. Based on the RCK_CDR_input_sel mode selected the input to IQ sampler may be chosen.

Figure 8:
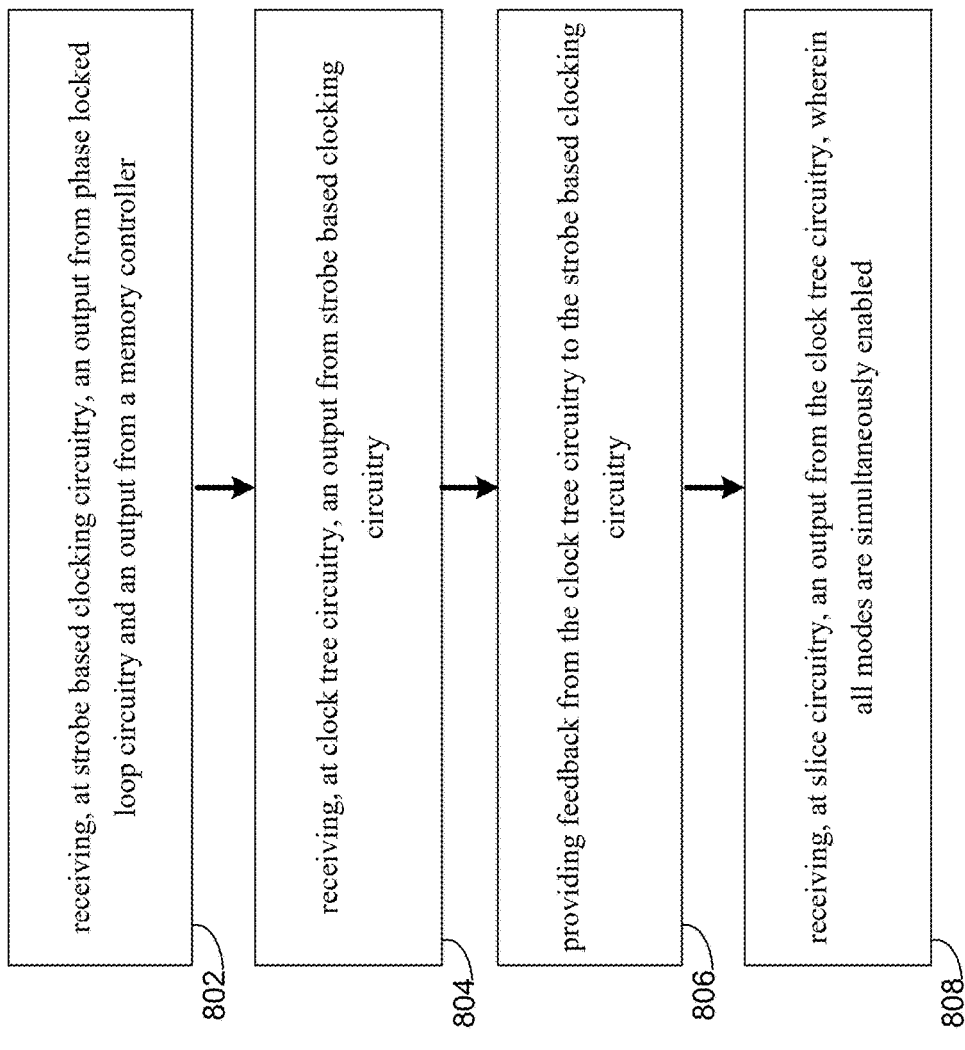
FIG. 8 is a flowchart depicting exemplary operations consistent with embodiments of the present disclosure.

Referring now to FIG. 8, a flowchart depicting exemplary operations consistent with a burst strobe read path clocking method is provided. The method may include receiving (802), at strobe-based clocking circuitry, an output from phase locked loop circuitry and an output from a memory controller. The method may further include receiving (804), at clock tree circuitry, an output from strobe-based clocking circuitry and providing (806) feedback from the clock tree circuitry to the strobe-based clocking circuitry. The method may also include receiving (808), at slice circuitry, an output from the clock tree circuitry, wherein a plurality of modes of operation are simultaneously enabled. Numerous other operations are also within the scope of the present disclosure.

Embodiments of the present disclosure provide numerous advantages over existing approaches. For example, all RCK modes are supported, even though RCK is distributed to data bitslices through a CML clock tree, AC coupled level shifter and injection locked loop (ILL)-based phase interpolators required for high-speed operations. As fast clock switching is performed to keep the clock distribution circuits at their quiescent operating point, no additional settling time or training is needed when a burst of RCK appears. The timing relations in the read data path through the memory controller is always maintained as the read path always gets a full rate clock. Any VT drift in DRAM does not appear at the read interface as the RCK may be used to sample the read data. However, it appears at phase aligner inputs. The phase aligner may tolerate much larger drift. As such, the drift of the clock tree inside DRAM may not cause the misalignment of CDR anymore. Though VT drift in the RCK clock path through the data samplers may cause misalignment of the clock and data recovery, the scheme of continuous VT tracking in all RCK modes does not allow misalignment to grow even in a non RCK period. The accumulated jitter may be greatly reduced due to RCK strobe-based clocking. This approach enables RCK strobe-based clocking for all modes associated with GDDR7 and other high-speed operations.

Embodiments of the present disclosure may enable support for all RCK modes, including burst mode. The RCK strobe may be used as a read path clock, which may be distributed through the CML clock tree, AC coupled CML2 CMOS level shifter and phase interpolators are there without any additional settling time requirement. The clock paths may settle very quickly when an RCK burst appears. Clock tree drift is always tracked even if RCK is stopped for a long time, which helps to address the issue of clock to data VT drift at samplers for the read data. Accumulated jitter may be reduced greatly due to reduced accumulation window. The BER may improve due to continuous VT tracking and less jitter accumulations.

Embodiments of the present disclosure may be used in any suitable application (e.g., GDDR7) or other high-speed applications where CML clock tree, phase interpolators and or ac-coupled stages are used in the read clock distributions path.

Referring now to FIGS. 9-13, embodiments of the present disclosure directed towards circuits and methods for skew-tolerant, glitch-free, multiplexing with auto-strobe burst detection are provided. In some embodiments, a clock multiplexer may enable RCK burst mode support, when RCK itself is used as sampling clock for the read path in GDDR7. In operation, when an RCK burst is received, the multiplexer may pass RCK at the output and no RCK phase local clock is passed. The switch over may be performed synchronously to avoid any glitch at the output. The clock multiplexer may detect the burst avoiding any expensive gate trainings. The multiplexer may tolerate larger skew between RCK and the local clock, which is synchronous to RCK. The clock multiplexer may ensure that the clock switch over occurs when RCK is running at full rate.

There are solutions for burst mode strobe based read path clocking in DDR4/5. However, these may all use a delay block for the phase movements and a CMOS clock tree due to lower data rate of operations. CMOS clock tree and delay may work with burst clock/strobe and may settle fast. However, in GDDR7 type applications the clock path may contain CML buffers and AC coupled stages and phase interpolators (for phase control). These may require a continuous full rate input clock to maintain their operating conditions for faster burst-to-burst turnaround.

In GDDR7, a separate differential RCK strobe may be introduced to mitigate the jitter accumulation issue in GDDR6 PHY where a local PLL clock is used to sample the incoming read data. This jitter accumulation has an adverse effect on bit error rate (BER) that can be achieved for a given data rate for the read path. To take advantage of RCK strobe-based sampling of the read data, the RCK needs to be distributed to all data slices as a sampling clock for the read data. As discussed above, there are three RCK modes in GDDR7; always on, burst and disabled. For higher data rates, a CML clock tree, AC coupled level shifter, and phase interpolators may be used in the clock path for superior performance. To ensure the receive clock path always maintains its operating condition a continuous full rate clock may be provided to the clock tree irrespective of whether RCK is toggling or not.

Accordingly, embodiments of the present disclosure provide a synchronous clock switching scheme between RCK and a local synchronous clock based on an RCK burst with auto-burst detection. This may help to avoid any training for the switching selection signal.

Referring again to FIG. 2, a typical timing diagram of a read operation with burst RCK in GDDR7 is provided. When an RCK burst starts it passes through multiple states as shown in the timing diagram (FIG. 2) before reaching its full rate. If an RCK strobe is to be used to sample the read data to have improved BER, the strobe path to the read data samplers needs to be stable before the mission mode (where the clock switching from CK to RCK occurs in between the READ data stream) read data arrives at the sampler input. At very high speeds, the CML clock tree, AC coupled CML to CMOS level shifters, and phase interpolator (PI) may be used to distribute the clock/strobe for their superior performance in terms of PSIJ and finer delay control needed for the read training. Some or all of these blocks may need some settling time after the input to these blocks reaches a stable frequency to generate stable clock/strobe. This may limit the burst-to-burst turnaround time. During the settling process some of the RCK edges may be missed as these analog blocks are still setting. The read interface may be trained in the beginning to establish the timing relation between the memory controller and DRAM. If any edges of the RCK are missed this timing relation may be broken, that needs a timing consuming iterative read training again before mission mode data may be received. Again, during a non-RCK burst period of the burst if a CML clock tree is driven to one logic state the tail current flows through the one side of the differential pair giving rise to an offset of the clock buffer, which results in duty cycle distortion at the output clock.

When a burst of RCK arrives at the at PAD, the RCK may be distributed to all data samplers. When RCK passes through distribution circuits it may require some settling time. The duty cycle, etc. of first few edges may not be very accurate but it is to be ensured that the edges with which active data are sampled should have a good duty cycle. Any duty cycle error in RCK will impact the timing margin as both edges may be used to sample the data.

A solution to this problem is to switch the input to the read clock/strobe path between to RCK strobe and local clock synchronous to RCK so that the whole clocking path maintains its operating condition and the timing relation between the memory controller and DRAM is always maintained. When RCK toggles at full rate, RCK may be chosen as an input to the clock/strobe path, otherwise the local clock. As such, read data may be received by the RCK strobe edges taking advantage of improved BER of strobe-based clocking. A synchronous clock multiplexer may be critical for the process and should have a number of attributes, each of which is described in further detail below. It must not produce any glitch at the output while switching over from one clock to other. The multiplexer may be configured to detect an RCK burst which may help to eliminate the need for any accurate trainings for the clock multiplexer selection signal. The multiplexer may absorb any drift between RCK and the local clock that may build up if there is no RCK burst for a long time and no drift tracking can be performed. Clock muxing may be performed synchronously for all phases of the clocks. The filtering of half rate edges may be performed, so that the clock path after the multiplexer always toggles at full rate.

Referring again to FIG. 3, some solutions for burst strobe based read path clocking may include, (e.g., DDR4/5 HBM2/3), clock/strobe gating circuits that may remove nonactive edges of the strobe. A gate training may position the gate signal with respect to the strobe. These solutions may work better for lower data rates, where a CMOS clock tree is used to distribute the strobe. And eye entering of the strobe may be performed using delay cells. These circuits may work with a burst read strobe. This scheme requires complex gate training to align a gate signal with respect to the incoming strobe. However, for GDDR7 type applications where a CML clock tree, phase interpolators, and AC coupled stages are used, a correct clock may not be produced with only active RCK edges.

Figure 9:
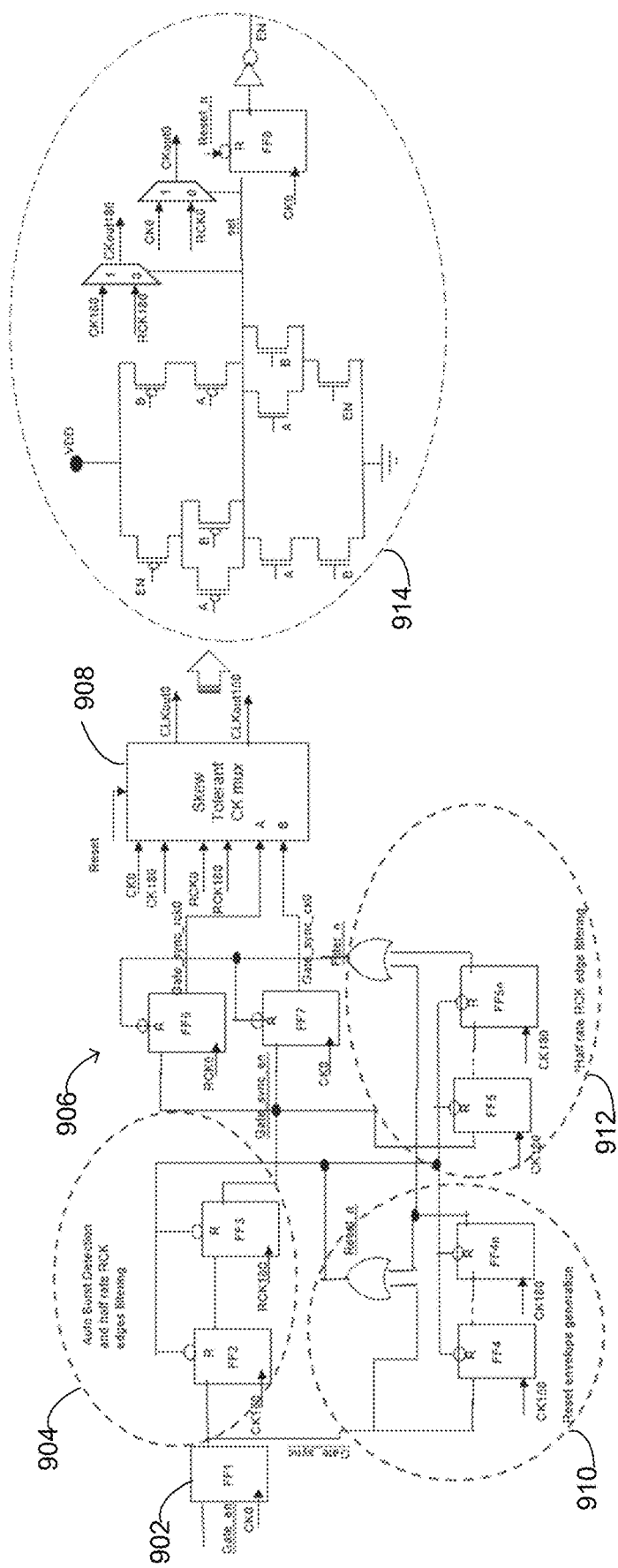
FIG. 9 is a block diagram of an alternative configuration consistent with embodiments of the present disclosure.

Referring now to FIG. 9, an embodiment showing an example circuit 900 depicting a skew tolerant, multiphase, CMOS clock multiplexer with auto strobe burst detection. Circuit 900 may include a first flip-flop 902 configured to receive a gate signal and to generate an output. Circuit 900 may further include auto-burst detection circuitry 904 having second and third flip-flops. Auto-burst detection circuitry 904 may be configured to receive the output at the second flip-flop and to generate an auto-burst detection circuitry output from the third flip-flop. A plurality of flip-flops 906 may be configured to receive the auto-burst detection circuitry output, wherein each of the plurality of flip-flops is configured to provide an input to multiplexer 908.

In some embodiments, plurality of flip-flops 906 may include two flip-flops. Plurality of flip-flops 906 may receive a synchronous local clock and an RCK clock respectively. Auto-burst detection circuitry 904 may be configured to perform half-rate RCK edge filtering. Circuit 900 may further include reset envelope generation circuitry 910 configured to receive the output from first flip-flop 902. Circuit 900 may further include half-rate RCK edge filtering circuitry 912 configured to receive the auto-burst detection circuitry output. Reset envelope generation circuitry 910 may include two flip-flops. Half-rate RCK edge filtering circuitry 912 may include two flip-flops. Any number of flip-flops may be used, for example, the number of flops depends on how many clock cycles the falling edge of the reset envelope is extended. A dotted line indicated there will be many flops. Half rate filtering may have many flip-flops. It depends on how many edges are to be filtered. Multiplexer 908 may include a two phase, four phase, or any other suitable clock multiplexer. Circuit 900 may also include circuit 914 include composite gate circuitry. The composite gate circuit is a state aware NAND/NOR combo-logic which receives 2 inputs (A, B) and switches 'sel' based on the most delayed edges of 'A and B. If there is any skew between the RCK clock and the CK clock the inputs 'A' and 'B' may also skew by the same amount. This logic may always ensure that 'sel' signal changes its state based on the delayed one between these two signals.

In this example, RCK0/180 and CK0/180 are complementary phases of RCK and a synchronous local clock respectively. Skew tolerant phase muxing with auto-burst detector is shown for two phase muxing only in the diagram. However, embodiments of the present disclosure are applicable to multiphase clock muxing. In the circuit of FIG. 9, the "Reset_n" signal may reset the path when burst is over. The "Filter_n" signal may remove the half rate cycles of RCK before passing the RCK to the output of the clock multiplexer.

Figure 10:
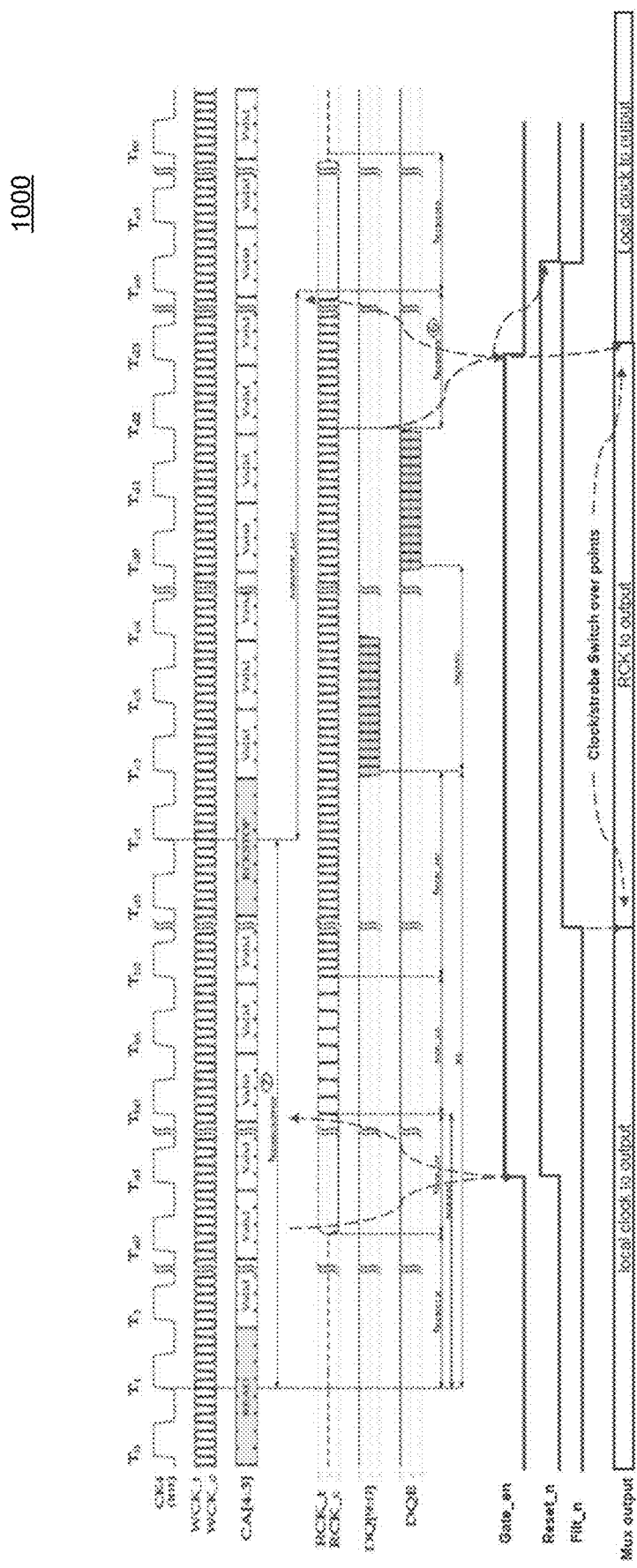
FIG. 10 is a timing diagram of a read operation with burst RCK in GDDR7 consistent with embodiments of the present disclosure.

Referring now to FIG. 10, a timing diagram of a read operation with burst RCK in GDDR7 is provided. In this particular example, the "Gate_en" signal may be generated as per the RCK burst shown. The assertion may occur when RCK is at a static low and de-assertion is performed during post-amble phase (i.e., the assertion of Gate_en happens before the RCK burst starts and de-assertion happens when the READ data burst is over and RCK burst is about to STOP) of the RCK burst after the last read data including DQE is received using active RCK strobe edges. As "tRCKEN" and "RCKSTOP_LAT" may be set by the controller PHY logic, the assertion and desertion may be timed without performing any separate trainings.

In operation, the "Gate_en" signal may be asserted when RCK is at differential logic 0 at the start of a burst as shown in FIG. 10. This signal may be generated in the local clock domain, which is synchronous to RCK. An auto burst detection part of the circuit shown in FIG. 9, helps to avoid any special gate training. The "Gate_en" signal may wait for the edges of RCK to propagate further to synchronous multiplexer stages. The "Reset_n" signal may be generated using multiple delay flip-flops (e.g., FF4 . . . . FF4n) and logic gate such that rising edge of "Gate_en" after first flip-flop 902 may de-assert the reset from the flip-flops and the entire sequential path may become active. The de-assertion may be delayed ensuring the multiplexer is switched back to the local clock. The "Filter_n" signal may be generated by delaying the "Gate_sync_en" signal using multiple delay flip-flops (e.g., FF5 . . . . FF5n) and extending the falling edge, so that first few half rate edges of the RCK may be avoided before passing the RCK to the output and the path may be reset once the clock is switched back to input local clock. The "Gate_en" signal may be synchronously transferred from the auto burst detection section of the circuit. The signals from both domains (e.g., Gate_sync_rck0 and Gate_sync_ck0) drive composite logic gate 914 shown in FIG. 9. Composite gate 914 may be configured to ensure that even if there is skew between the RCK and local clock domains, transitions of the "sel" signal to the clock multiplexer may be triggered by the latest of Gate_sync_rck0 and Gate_sync_ck0. The falling edge of the "sel" signal may be driven though the NAND section and the rising edge may be driven by the NOR section of composite gate 914. This makes the clock muxing glitch free when switching to RCK and back to the local clock. The synchronous "Gate_en" signal and selection input generation for two complementary clock phase muxing is shown in FIG. 9. It should be noted that this concept is applicable to multi-phase clock muxing. In the GDDR7 protocol an example of a burst of an RCK strobe is shown in FIG. 10.

In some embodiments, local clock phases ("CK_0/180") are synchronous to 'RCK_0/180'. The multiplexer selection signal ("Gate_en") may be generated based on "read/RCK start" and "RCK stop" commands as shown in FIG. 10. Assertion may be performed in a static phase and de-assertion may be performed in post amble phase of the RCK burst after all the data are received. The signal may be generated in the local clock domain and transferred to the RCK clock domain from FF2 to FF3 as "Gate_sync_en". The "Gate_en" signal may be asserted before the RCK edges arrive and it will not propagate further until the first rising edge of RCK_180 arrives. This provides an auto burst detection function to the clock multiplexer. No strict timing requirement exists for the assertion of the "Gate_en" signal with respect to RCK edges, it only needs to go high during the static phase of RCK, training of this signal with respect to RCK is not needed. A separate signal "Filter_n" may be generated by delaying the "Gate_sync_en" signal and extending the falling edge using delay flipflops (e.g., FF5 . . . . FF5n) so that the "Gate_sync_en" signal propagates to one or more flip-flops (e.g., FF6/7) after the RCK half rate edges are removed. The "Gate_sync_ck0" and "Gate_sync_rck0" signals may then be used for a synchronous clock switch over to pass RCK at the output of the clock multiplexer. "Gate_sync_ck0"=A and "Gate_sync_rck0"=B may be used to generate the final multiplexer selection "sel" for muxing of 0/180 degree phases of the RCK and the synchronous local clock. State-aware NAND/NOR logic shown in FIG. 10 may receive these inputs and switch the "sel" signal based on the most delayed edges of "gate_sync_ck0"=A and "gate_sync_rck0"=B. If there is any skew between RCK0 and CK0 the A and B may also skew by the same amount. This logic may always ensure that the "sel" signal changes its state based on the delayed signal of these two signals. This feature makes the circuit immune to larger skew between these two clocks and may produce a glitch free output in presence of skew. It should be noted that when "sel"=0 and EN=1 the NAND section of NAND/NOR logic may be enabled and the rising edge of the "sel" signal may be determined by the most delayed falling edge of the two signals A/B. Again, when "sel"=1 and EN=0 the NOR section of NAND/NOR logic may be enabled and falling edge of the "sel" signal may be determined by the most delayed rising edge of two signals A/B. The "Gate_en" signal needs to be de-asserted before the RCK burst is over as shown in FIG. 2. The falling edge may be synchronized to RCK_0 and CK_0 domain as 'Gate_sync_ck0'=A and 'Gate_sync_rck0'=B to change the multiplexer selection 'sel' (shown in the inset) to pass the local clock at the output. The amount of skew between RCK_* and CK_* that may be tolerated may be calculated as follows. If tPERIOD and tDCD are the time period and duty cycle distortion of the clock, tCK2Q is the clock to Q delay of the flipflops and tSETUP input to selection signals setup time for the multiplexer stage and tLogic is the worst delay of NAND/NOR combo-logic.

$$tSKEW(max)=(tPERIOD/2)-tDCD-tCK2Q-tLOGIC-tSETUP$$

The skew may be improved if clock to skew tolerance multiplexer is delayed by tDLY.

$$\text{New } tSKEW \text{ is } tSKEW(max)=(tPERIOD/2)+tDLY-tDCD-tCK2Q-tLOGIC-tSETUP$$

Embodiments of the present disclosure provide numerous advantages over existing approaches. Since there no strict timing relation of the "Gate_en" signal with respect to the incoming RCK edges, it may be asserted in the static "0" phase of RCK and no training of the "Gate_en" signal needed. The clock switch over may occur automatically when the RCK burst arrives. An RCK preamble edge filtering technique may ensure the clock/strobe path obtains RCK as an input only when RCK starts toggling at full rate. Clock switch over may be performed in a synchronous manner without producing any glitch even if there is skew between RCK and local clock builds up. This synchronous clock multiplexer enables usage of CML clock tree, AC coupled level shifters, and phase interpolators in the strobe path for a GDDR7 application without requiring extra settling time when a burst of RCK comes in. The clock multiplexer detects the RCK burst automatically so the "Gate_en" signal need not be placed very accurately with respect to the incoming RCK. The clock switch over is performed only when RCK reaches full-rate toggling. Larger skew between the clock domain may not produce any glitches. Embodiments included herein may enable RCK burst mode with RCK strobe to sample the read data for a GDDR7 application where the strobe/clock is to be distributed though high performing circuits like CML clock tree, AC coupled CML2CMOS level shifter and phase interpolators without any additional settling time requirement.

Embodiments included herein may be used in GDDR7 high-speed applications where CML clock tree, phase interpolators and or AC-coupled stages are used in the read clock distributions path. This scheme can be used for synchronous burst or continuous clocks in the presence of skew between the clocks.

Figure 11:
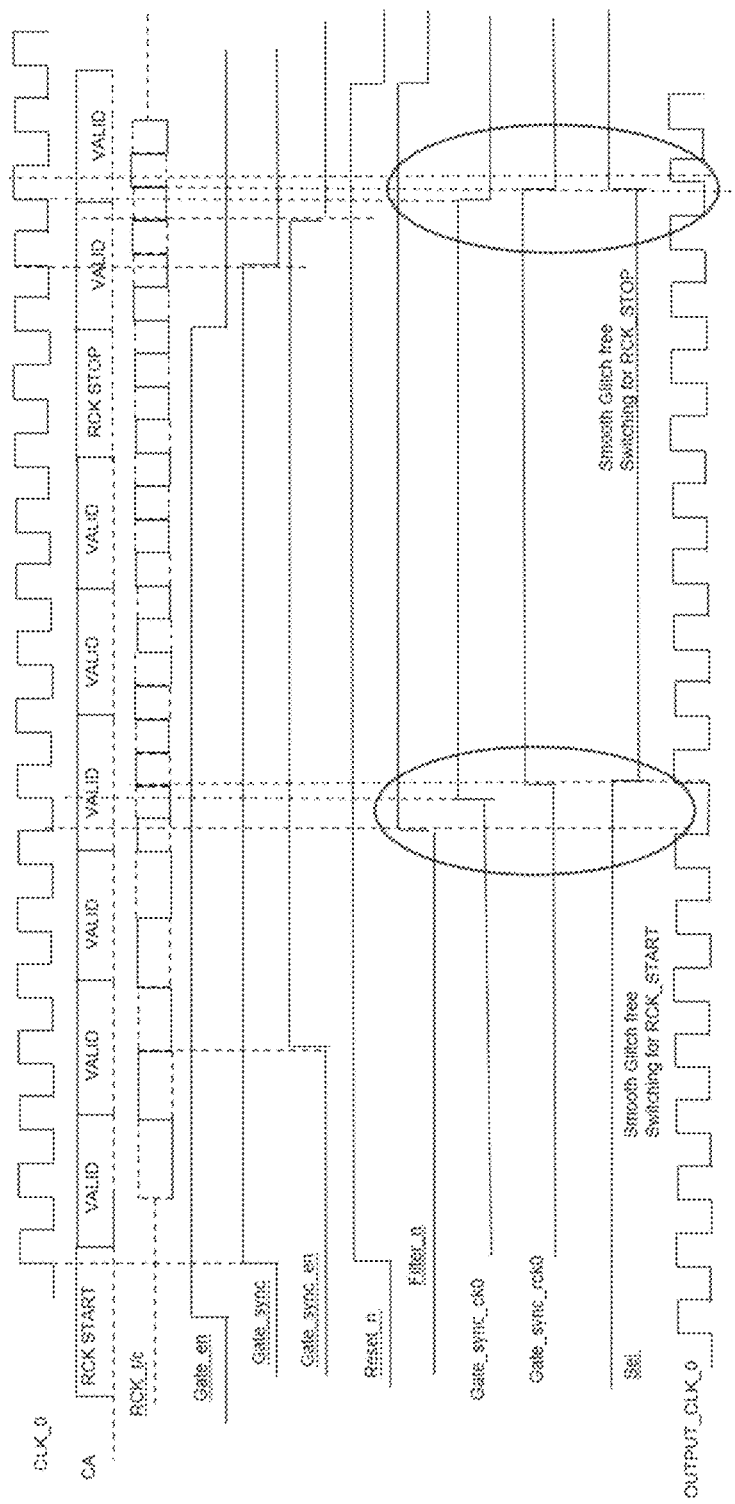
FIG. 11 is a timing diagram of internal signals consistent with embodiments of the present disclosure.

Referring now to FIG. 11, a timing diagram of internal signals is provided. The signal "Gate_en" may be triggered by the "RCKSTART" command. The assertion of the "Filter n" signal may be delayed from that of "Gate_en" to remove half rate RCK edges. The assertion of "Filter_en" enables the "Gate_sync_en" to propagate further to generate "gate_syn_ck0" and "gate_syn_rck0" in local clock and RCK clock domains. The final selection signal of the clock mux 'sel' may be generated by delayed signal of "gate_sync_ck0" and "gate_syn_rck0". The duty cycle of output clock will get distorted due to CK and RCK skew for one cycle during switch over as highlighted in highlighted ovals.

Figure 12:
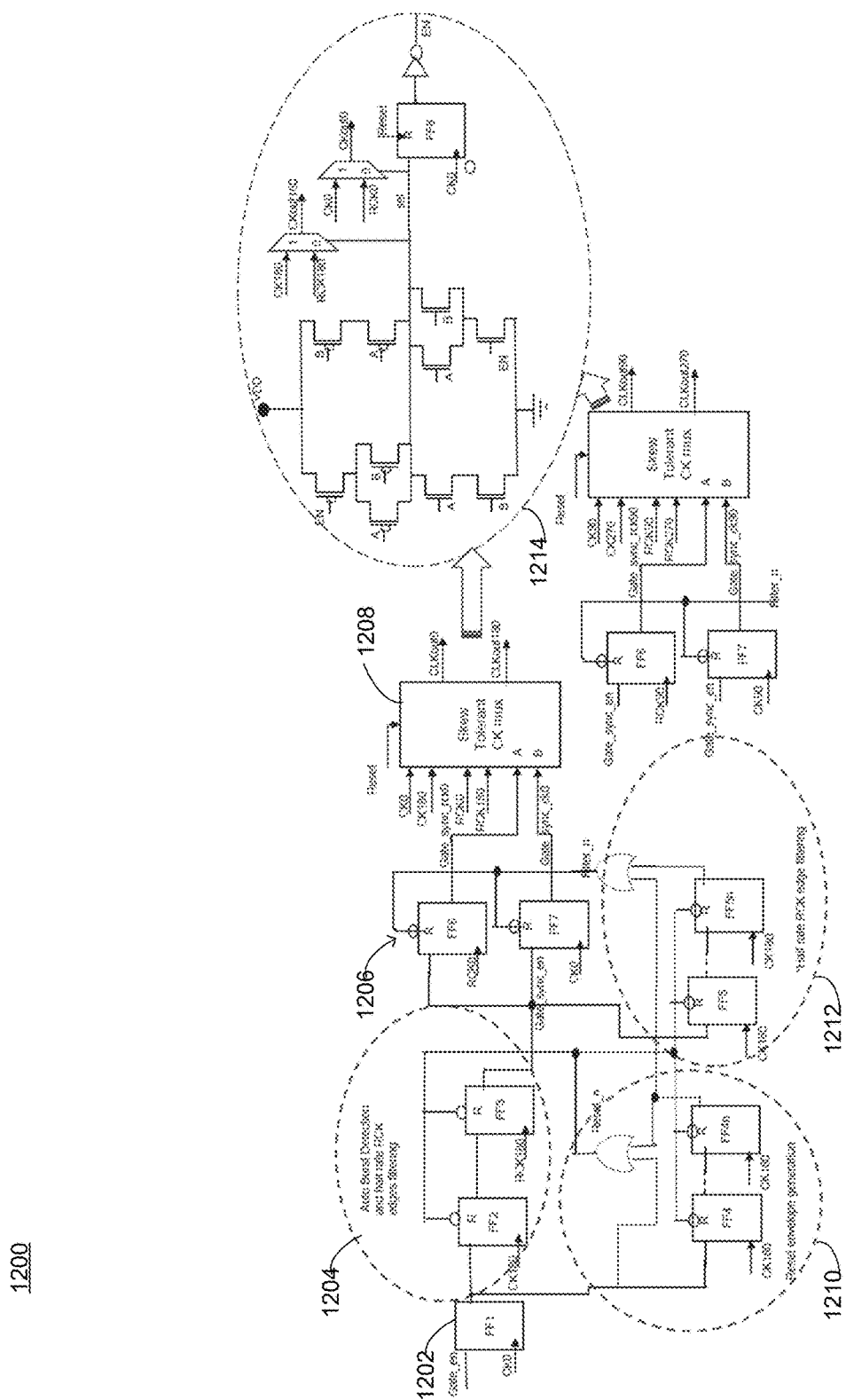
FIG. 12 is a block diagram of an alternative configuration consistent with embodiments of the present disclosure.

Referring now to FIG. 12, an embodiment showing a four-phase implementation is provided. In this example, the "Gate_sync_en" signal may be transferred to the RCK0/90 and CK0/90 domain. And the synchronous signals in the respective clock domains may be used to multiplex the differential phases (e.g., 0/180 degrees and 90/270 degrees) using two instances of a skew tolerant clock multiplexer.

Figure 13:
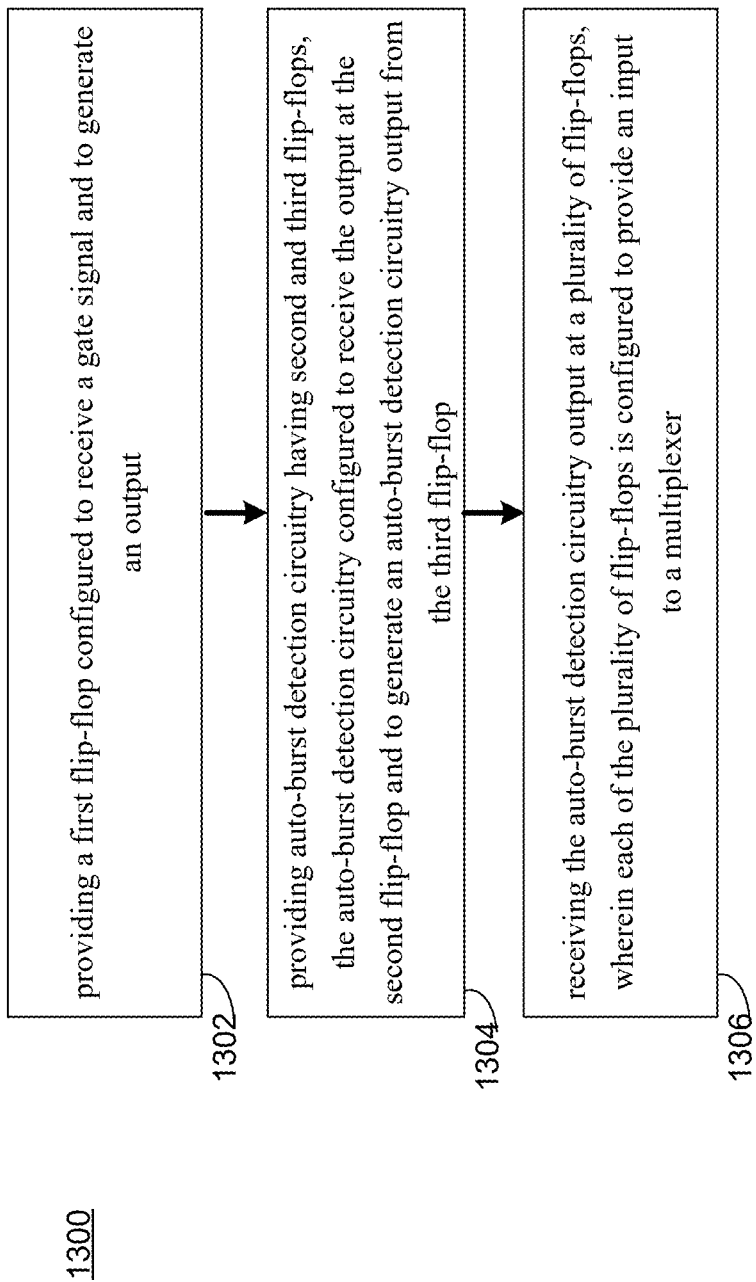
FIG. 13 is a flowchart depicting exemplary operations consistent with embodiments of the present disclosure.

Referring now to FIG. 13, a flowchart 1300 showing operations consistent with embodiments of the present disclosure is provided. The method may include providing 1302 a first flip-flop configured to receive a gate signal and to generate an output. The method may further include providing 1304 auto-burst detection circuitry having second and third flip-flops, the auto-burst detection circuitry configured to receive the output at the second flip-flop and to generate an auto-burst detection circuitry output from the third flip-flop. The method may also include receiving 1306 the auto-burst detection circuitry output at a plurality of flip-flops, wherein each of the plurality of flip-flops is configured to provide an input to a multiplexer. Numerous other operations are also within the scope of the present disclosure.

In some embodiments, implementations for 2 and 4 phase clocking have been provided. However, ideally this may be expanded to any even phase clocking (e.g., 8, 16, etc.).

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A skew-tolerant, glitch-free multiplexer circuit comprising:
   a first flip-flop configured to receive a gate signal and to generate an output;
   auto-burst detection circuitry having second and third flip-flops, the auto-burst detection circuitry configured to receive the output at the second flip-flop and to generate an auto-burst detection circuitry output from the third flip-flop;
   a plurality of flip-flops configured to receive the auto-burst detection circuitry output, wherein each of the plurality of flip-flops is configured to provide an input to a multiplexer; and
   reset envelope generation circuitry configured to receive the output from the first flip-flop wherein the reset envelope generation circuitry includes at least two flip-flops.

2. The skew-tolerant, glitch-free multiplexer circuit of claim 1, wherein the plurality of flip-flops includes two flip-flops.

3. The skew-tolerant, glitch-free multiplexer circuit of claim 2, wherein the plurality of flip-flops receive a synchronous local clock and an RCK clock respectively.

4. The skew-tolerant, glitch-free multiplexer circuit of claim 1, wherein the auto-burst detection circuitry performs half rate RCK edge filtering.

5. The skew-tolerant, glitch-free multiplexer circuit of claim 1, further comprising:
   half-rate RCK edge filtering circuitry configured to receive the auto-burst detection circuitry output.

6. The skew-tolerant, glitch-free multiplexer circuit of claim 5, wherein the half-rate RCK edge filtering circuitry includes two flip-flops.

7. The skew-tolerant, glitch-free multiplexer circuit of claim 1, wherein the multiplexer is a two-phase clock multiplexer.

8. The skew-tolerant, glitch-free multiplexer circuit of claim 1, wherein the multiplexer is a four-phase clock multiplexer.

9. A method for use with a skew-tolerant, glitch-free multiplexer circuit comprising:
   providing a first flip-flop configured to receive a gate signal and to generate an output;
   providing auto-burst detection circuitry having second and third flip-flops, the auto-burst detection circuitry configured to receive the output at the second flip-flop and to generate an auto-burst detection circuitry output from the third flip-flop; and
   receiving the auto-burst detection circuitry output at a plurality of flip-flops, wherein each of the plurality of flip-flops is configured to provide an input to a multiplexer; and
   reset envelope generation circuitry configured to receive the output from the first flip-flop wherein the reset envelope generation circuitry includes at least two flip-flops.

10. The method of claim 9, wherein the plurality of flip-flops includes two flip-flops.

11. The method of claim 10, wherein the plurality of flip-flops receive a synchronous local clock and an RCK clock respectively.

12. The method of claim 9, wherein the auto-burst detection circuitry performs half rate RCK edge filtering.

13. The method of claim 9, further comprising:
   half-rate RCK edge filtering circuitry configured to receive the auto-burst detection circuitry output.

14. The method of claim 13, wherein the half-rate RCK edge filtering circuitry includes two flip-flops.

15. The method of claim 9, wherein the multiplexer is a two-phase clock multiplexer.

16. The method of claim 9, wherein the multiplexer is a four-phase clock multiplexer.

* * * * *